United States Patent
Kato

(10) Patent No.: US 7,159,833 B2
(45) Date of Patent: Jan. 9, 2007

(54) COUPLING DEVICE FOR PORTABLE TERMINAL

(75) Inventor: Hideo Kato, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 0 days.

(21) Appl. No.: 10/823,126

(22) Filed: Apr. 13, 2004

(65) Prior Publication Data
US 2004/0206876 A1  Oct. 21, 2004

(30) Foreign Application Priority Data
Apr. 17, 2003  (JP) ............... 2003-113238

(51) Int. Cl.
*A47B 91/00* (2006.01)
*H04M 1/00* (2006.01)

(52) U.S. Cl. .............. 248/349.1; 248/292.13; 361/681; 455/575.4

(58) Field of Classification Search ........... 248/118, 248/918, 118.1, 309.1, 311.2, 349.1, 477, 248/478, 481, 118.5, 288.11, 288.31, 292.13, 248/292.14; 455/566, 575.1, 570, 575, 556.1, 455/550.1, 575.4; 361/679, 680, 681; 224/197, 224/199, 271, 272
See application file for complete search history.

(56) References Cited

U.S. PATENT DOCUMENTS

| | | | | |
|---|---|---|---|---|
| 4,406,928 A | * | 9/1983 | MacKenzie | ............... 379/454 |
| 5,620,120 A | * | 4/1997 | Tien | ............... 224/199 |
| 5,746,480 A | * | 5/1998 | Bonutti | ............... 297/411.35 |
| 5,850,954 A | * | 12/1998 | Dong-Joo | ............... 224/197 |
| 5,947,359 A | * | 9/1999 | Yoshie | ............... 224/570 |
| 6,073,027 A | * | 6/2000 | Norman et al. | ............... 455/575.4 |
| 6,203,109 B1 | * | 3/2001 | Bergsten et al. | ............... 297/411.35 |
| 6,488,244 B1 | * | 12/2002 | Ruan et al. | ............... 248/118.1 |
| 6,519,483 B1 | * | 2/2003 | Watanabe | ............... 455/575.1 |
| 6,522,529 B1 | * | 2/2003 | Huilgol et al. | ............... 361/681 |
| 6,751,473 B1 | * | 6/2004 | Goyal et al. | ............... 455/556.1 |
| 6,842,626 B1 | * | 1/2005 | Kubo et al. | ............... 455/550.1 |
| 2003/0202656 A1 | * | 10/2003 | Ikeuchi et al. | ............... 379/419 |
| 2004/0137940 A1 | * | 7/2004 | Matsunami | ............... 455/550.1 |
| 2004/0189597 A1 | * | 9/2004 | Amitani et al. | ............... 345/156 |
| 2004/0206876 A1 | * | 10/2004 | Kato | ............... 248/349.1 |

FOREIGN PATENT DOCUMENTS

JP  10-315874  * 12/1998

* cited by examiner

*Primary Examiner*—Carl D. Friedman
*Assistant Examiner*—Tan Le
(74) *Attorney, Agent, or Firm*—Notaro & Michalos PC

(57) ABSTRACT

A coupling device couples a first member and a second member to be relatively slidable and horizontally rotatable. The device is provided with the first member having a keyboard unit section and the second member having a display unit section in respectively separate boxes thereof. The coupling device includes a main body portion having a long guide hole to be attached to either of the first member or the second member in the longitudinal direction, and a movable portion to be attached to the other member of the first member and the second member. The main body includes a case body provided with a long guide groove, and a lid portion provided with a long guide hole, and the movable portion includes a head portion to be passed through the long guide hole and a guide leg portion to be fitted into the long guide groove. When the movable portion is rotatably fitted into the main body, a guide recess portion is provided next to the long guide groove for allowing the guide leg portion to rotate.

7 Claims, 10 Drawing Sheets

COUPLING DEVICE FOR PORTABLE TERMINAL

BACKGROUND OF THE INVENTION

1. Field of the Invention

In a portable terminal composed of a keyboard unit section being a first member and a display unit section being a second member, which are provided in respective separate boxes, the present invention relates to a coupling device for the portable terminal which is suitable for using at the time when the first member and second member are installed in a manner to be relatively slidable in one direction and relatively rotatable to each other.

2. Description of the Relevant Art

In recent years, it has been known that among portable terminals, especially in a portable telephone, a keyboard unit section being a first member and a display unit section being a second member are provided in respective boxes independent to each other, and when not in use, both members are put on top of each other so that the second member covers the top face of the first member, but when in use, the both members are allowed to be slid relatively so that the keyboard unit section is exposed. As a portable telephone having such a configuration, the one disclosed in Japanese Patent Application Laid-open No. 2003-46625 is well known.

A coupling device for a portable telephone described in the above-described known document is structured in such a manner that the upper box forming the second member provided with the display unit section having a display unit and a speaker is slidably mounted in a longitudinal direction on the lower box forming the first member provided with a keyboard unit section having a keyboard and a microphone.

SUMMARY OF THE INVENTION

The above-described conventionally known coupling device for a portable telephone has a function capable of sliding the first member and the second member arbitrarily when in use, but has no function to horizontally rotate the second member with respect to the first member. Therefore, when, for instance, there is a demand to use a screen display of the display unit section being the second member in sideways widely, if the second member is placed sideways in compliance with the above demand, the first member also has to face sideways, which causes a problem of poor operability.

Therefore end users and people in the field have requested that a coupling device be provided to permit the screen display to be operated sideways because of a better operability when images are displayed or text is prepared on the screen.

The above-described function is widely demanded not only for a portable telephone but also for a pocket computer and other portable terminals similarly composed of the first and second members respectively independent to each other.

In order to solve the above-described problem, for a portable terminal slidably composed of a keyboard unit section being a first member and a display unit section being a second member, which are provided in respective separate boxes, an object of the present invention is to provide a coupling device for a portable terminal which is capable of performing a sliding function to make the first member and the second member relatively slidable in one direction, and, at the same time, a rotating function to rotate the second member and the first member relatively in a horizontal direction.

Hereinafter, an explanation will be made for the case of applying the invention to a portable telephone, but as described above, it is needless to say that the present invention is widely applicable to other portable terminals not described above.

In order to achieve the above-described object, the present invention is to provide a coupling device for a portable terminal to couple a first member and a second member to be relatively slidable and horizontally rotatable in the portable terminal which makes up the first member having a keyboard unit section and the second member having a display unit section in respectively separate boxes, the coupling device being composed of a main body portion having a long guide hole to be attached to either one of the first member and the second member in the longitudinal direction, and a movable portion to be attached to the other of the first member and the second member to make the other member rotatable horizontally at a predetermined sliding position.

For this purpose, the present invention is characterized in that when the movable portion is slidably fitted into the main body, the main body is composed of a case main body provided with a long guide groove and a lid portion provided with a long guide hole, and the movable portion is composed of a head portion to be passed through the long guide hole and a guide leg portion to be fitted into the long guide groove; and when the movable portion is rotatably fitted into the main body, a guide recess portion is provided next to the long guide groove for allowing the guide leg portion to rotate.

At this time, the present invention is further composed of bearing to be attached to the guide leg portion of the movable portion so as to allow a portion of the bearing into the long guide groove.

The present invention is further composed of a stopper wall provided in the guide recess portion to control rotation of the movable portion.

The present invention is further composed of an arresting means between the main body and the movable portion to stably halt the movable portion at a predetermined position and the arresting means is composed of a pair of arresting plates slidably biased in mutually opposite directions to sandwich a portion of the movable portion.

Further, the present invention is characterized in that the case main body and the lid portion are allowed to sandwich the arresting plate therebetween in a slidably biased state in one direction and respective both side portions are engagedly fixed with an arresting member.

The present invention is further characterized in that a means for relatively rotating the first member and the second member horizontally is provided between the member to which the movable portion is attached and the movable portion.

The present invention is also characterized in that the arresting means for halting the movable portion at a predetermined position is composed of a ball attached to the movable member in a slidably biased state in one direction and a recess portion provided on the main body side to receive the ball.

DETAILED DESCRIPTION OF THE PREFERRED EMBODIMENT(S)

Figure 1:
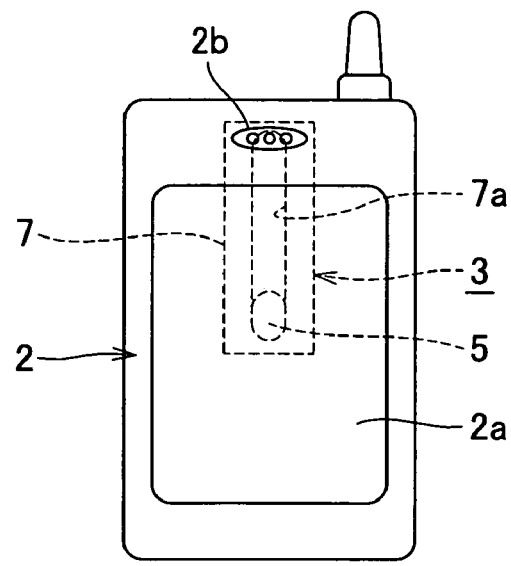
FIG. 1 is a plan view showing a state that a display unit section being a second member is overlaid on a keyboard unit section being a first member of a portable telephone employing the present invention.
Figure 2:
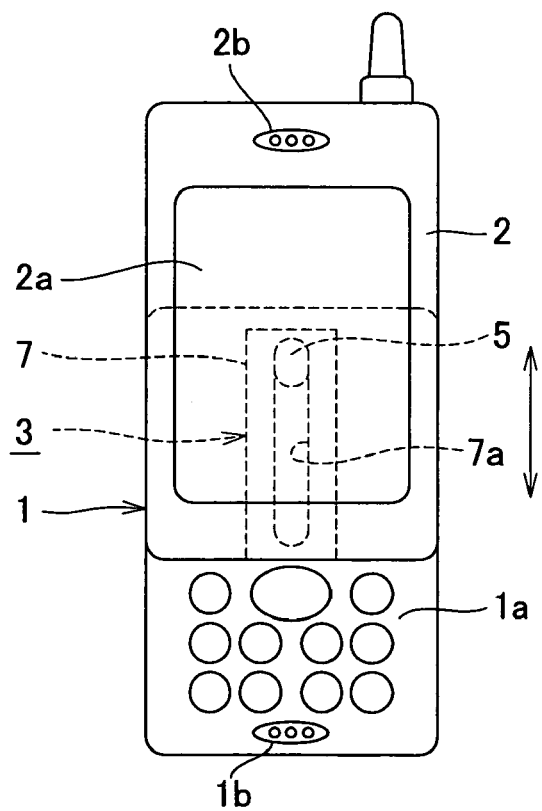
FIG. 2 is a plan view showing a state that the first member and the second member are being slid to each other from the previous state.
Figure 3:
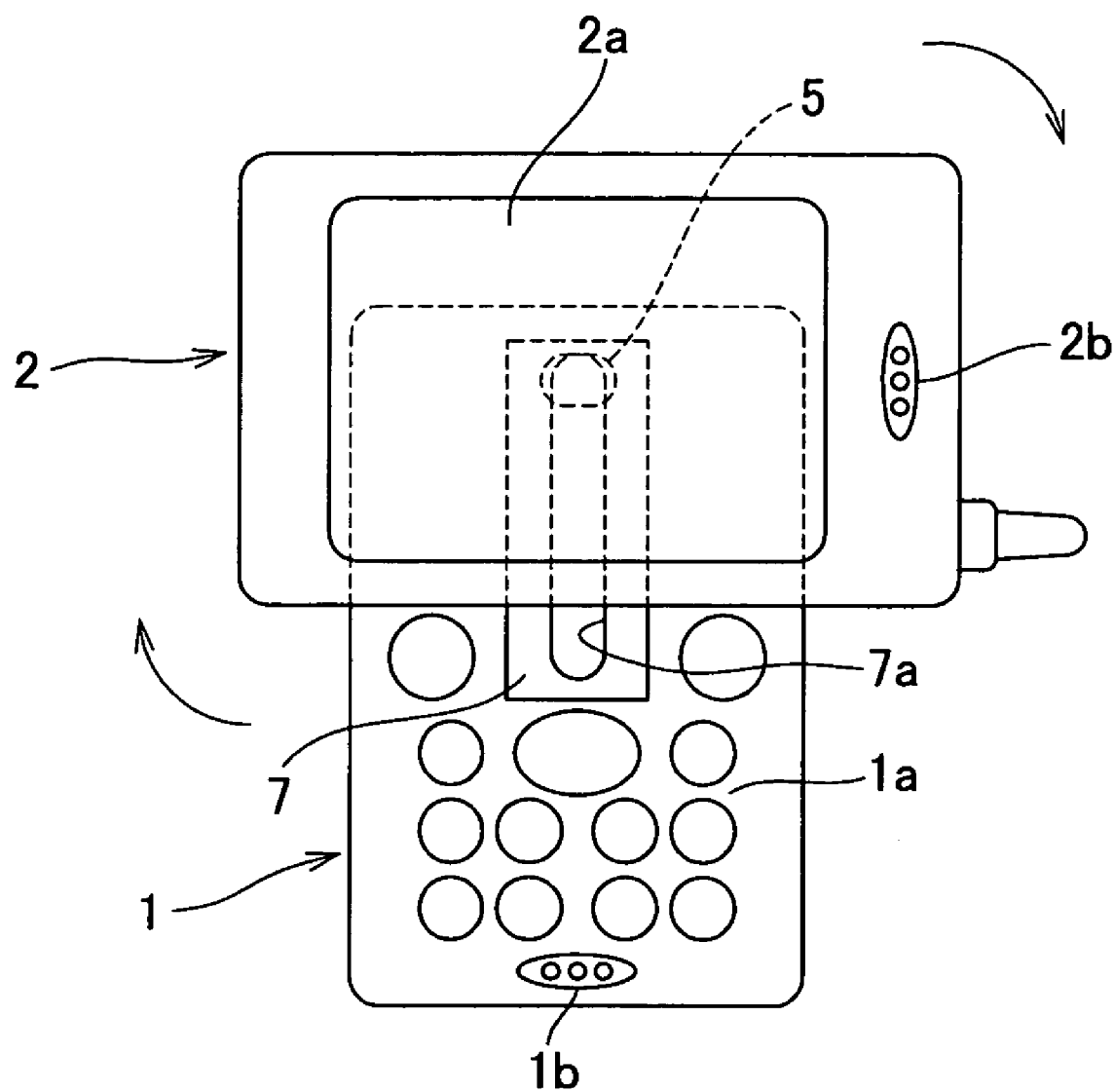
FIG. 3 is a plan view showing that the display unit section being the second member is allowed to rotate 90° horizontally.
Figure 4:
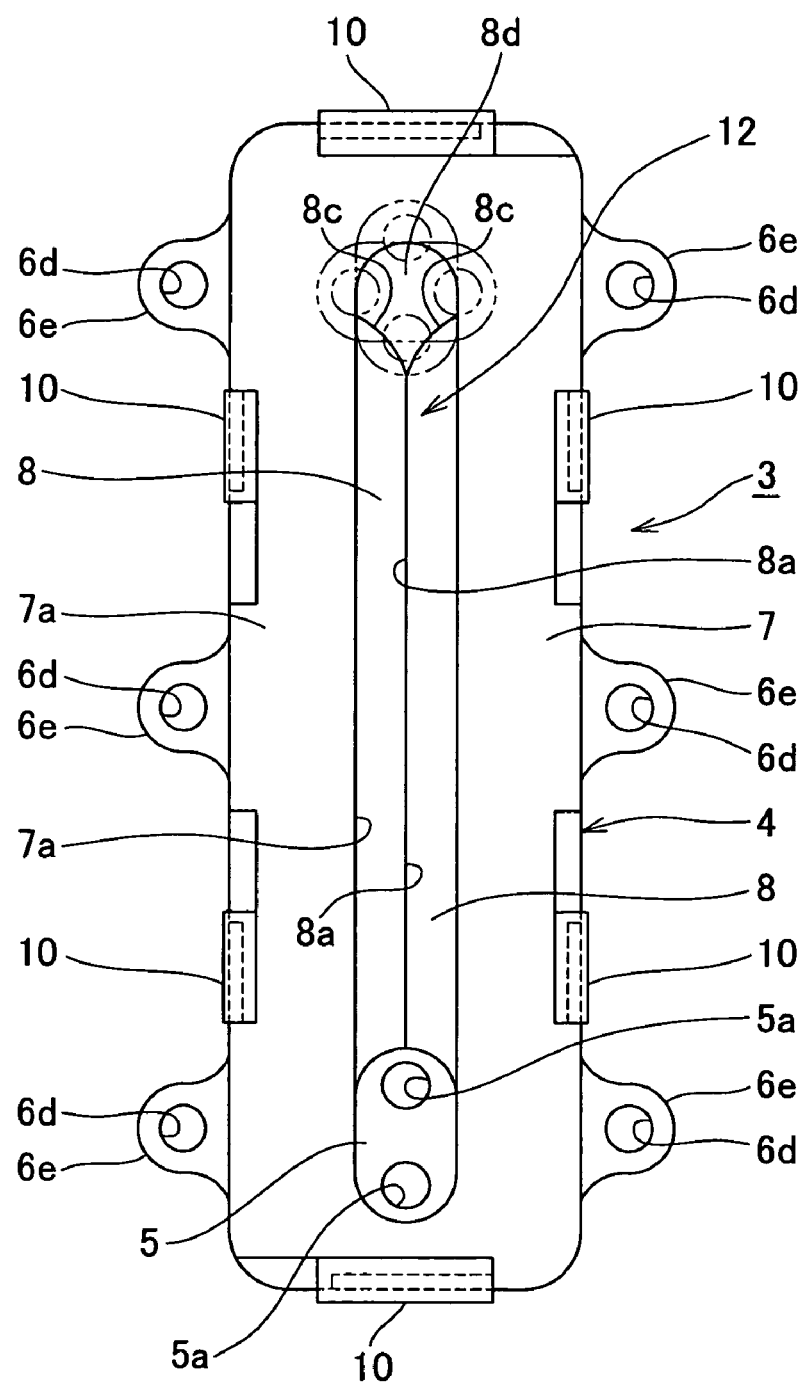
FIG. 4 is a plan view of a coupling device according to the present invention.

Hereinafter, an embodiment of the present invention will be explained in detail based on the drawings. FIG. 1 to FIG. 3 show a portable telephone which is an example of a portable terminal employing the present invention, reference number 1 denotes a keyboard unit section having a keyboard 1a and a microphone 1b on an upper surface composing a first member, and reference number 2 denotes a display unit having a display unit 2a and a speaker 2b on an upper surface composing a second member. The keyboard unit section 1 and the display unit section 2 are disposed in separate boxes, respectively.

A figure shown by reference number 3 is a coupling device according to the present invention for coupling the keyboard unit section 1 and the display unit section 2. It is structured so that with this coupling device 3, it becomes possible to relatively slide the keyboard unit section 1 and the display unit section 2 toward each other in one direction, as shown in FIG. 2 in particular, and at the same time, as shown in FIG. 3 in particular, the display unit section 2 can rotate by 90° with respect to the keyboard unit section 1 in a 90° horizontal direction (rightward in the drawing) so that the screen of the display unit section 2 can be used in a lateral direction giving a wider display.

The coupling device 3 is composed of a main body 4 and movable portion 5, and structured to have the main body 4 on the keyboard unit section 1 side and the movable portion 5 on the display unit section 2 side, but it is also acceptable to have the main body 4 on the display unit section 2 side and the movable portion 5 on the keyboard unit section 1 side, respectively.

FIG. 4 to FIG. 7 show the structure of the coupling device 3, and in the drawings, the main body 4 is composed of a case main body 6 and a lid body 7 to cover the upper of the case main body 6. Between the case main body 6 and the lid body 7, there is an arresting means 12 composed of a pair of rectangular arresting plates 8 and 8 slidably opposed to each other and an elastic means composed of a plurality of, for instance, compression springs for slidably biasing these arresting plates 8 and 8 in a direction to abut on each other.

Figure 9:
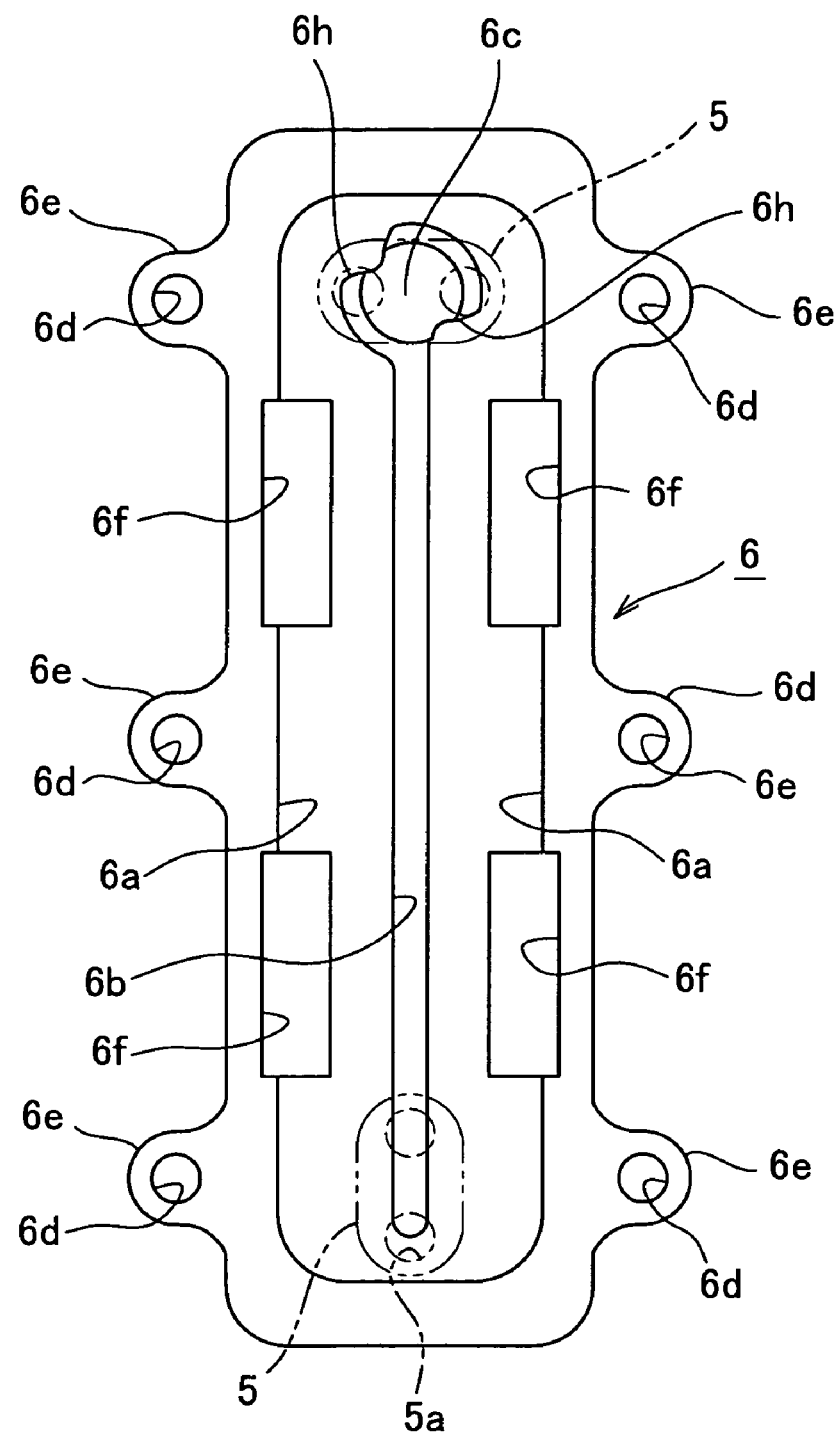
FIG. 9 is a plan view of a main body of the coupling device.

On the case main body 6 side, as shown in FIG. 9 in particular, there provides further an arresting plate housing portion 6a, a long guide groove 6b on the central portion in the longitudinal direction of the arresting plate housing portion 6a, and a guide recess portion 6c connected to the upper end of the long guide groove 6b. On both sides of the case main body 6, a plurality of fitting pieces 6e with fitting holes 6d on respective fitting pieces are provided and a plurality of recess portions 6f for housing the elastic means 9 composed of a plurality of compression springs are formed.

Figure 6:
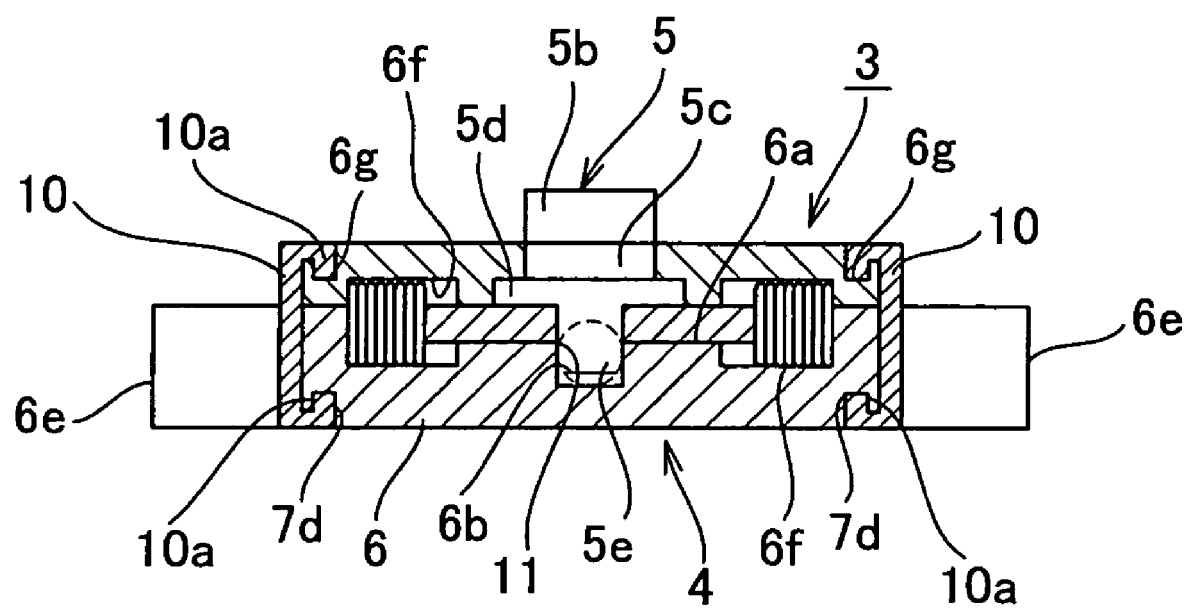
FIG. 6 is a sectional view of the coupling device according to the present invention.
Figure 7:
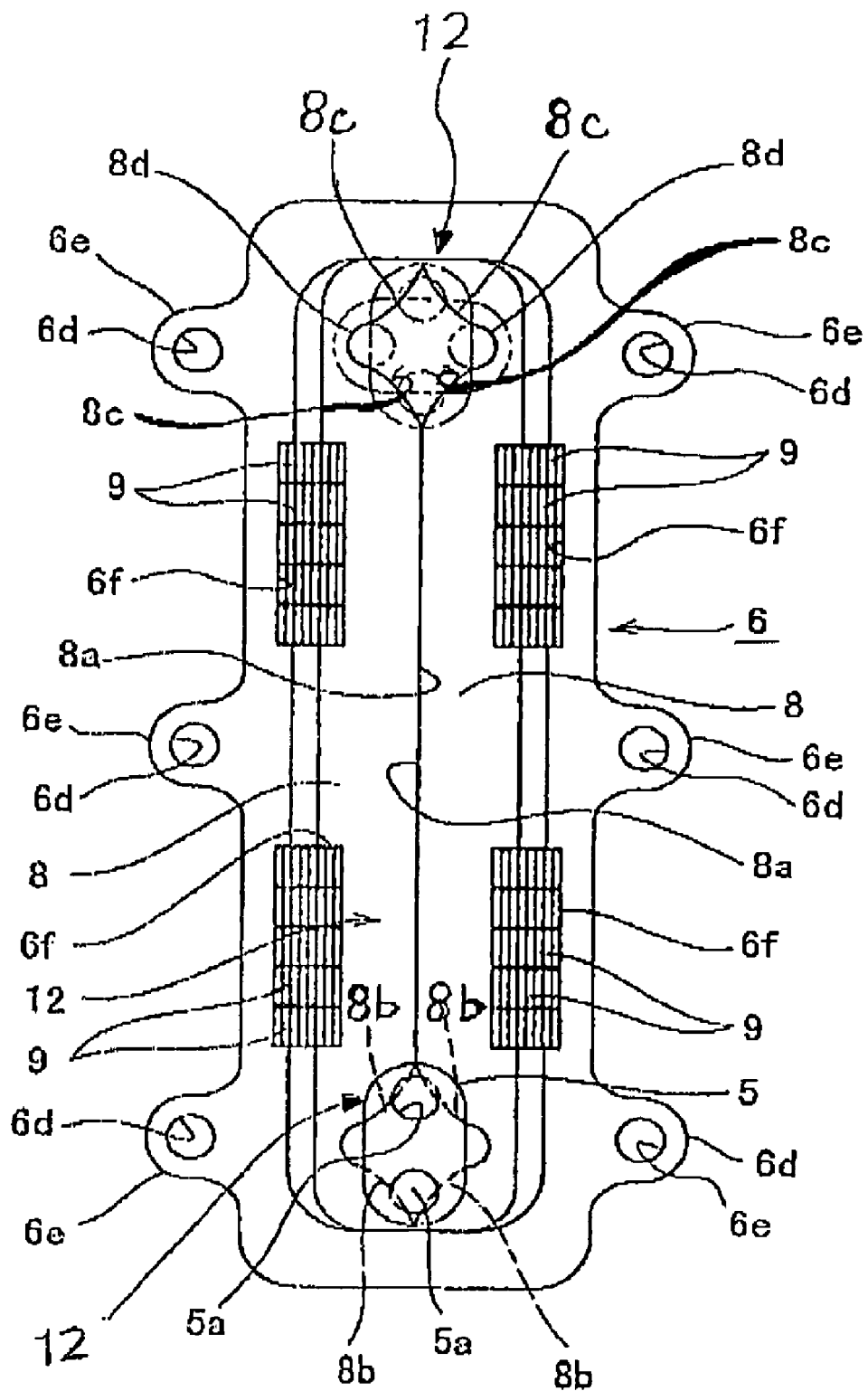
FIG. 7 is a plan view of the coupling device shown in FIG. 4 from which a lid body is removed.
Figure 10:
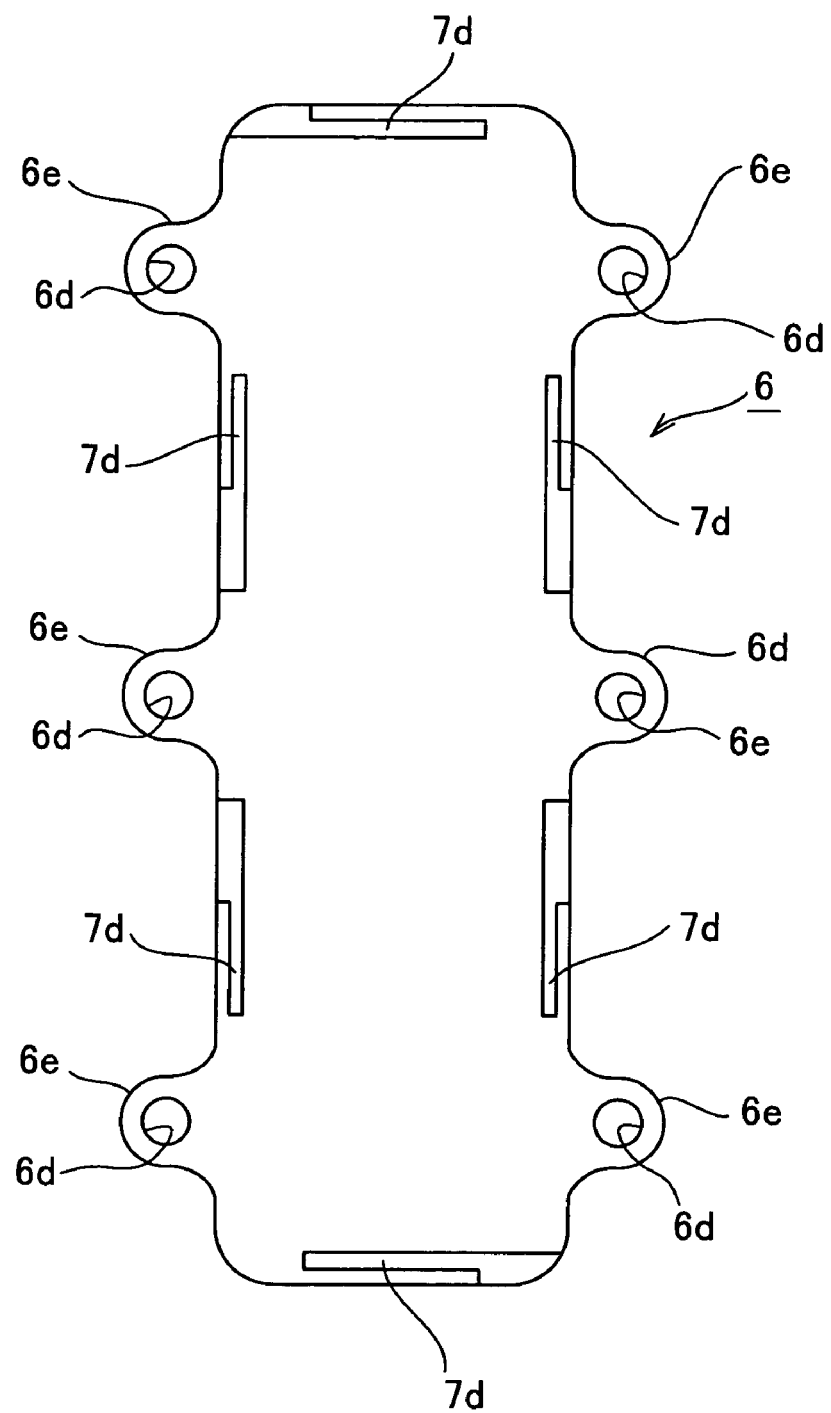
FIG. 10 is a plan view of the lid body of the coupling device.

On the central portion in the longitudinal direction of the lid body 7, formed is a long guide hole 7a which is formed in a sectionally convex shape formed of a wide-width portion 7b on the bottom face and a narrow-width portion 7c on the upper face. A device for fixing the lid body 7 to the case main body 6 is a plurality of arresting members 10 having a C-channel shape to firmly fixed both of the lid body 7 and the case main body 6 by engaging upper and lower curved edge portions 10a and 10a with a plurality of arresting grooves 6g and 7d provided on the case main body 6 and the lid body 7, as shown in FIG. 6 and FIG. 10, in particular. The fixing means is an example and other engaging means or fixing screws can be used.

The arresting plates 8 and 8 are Cong plate-like members structured with flat press portions 8a and 8a on the central edge portions and arresting means 12 comprising first arresting portions 8b, 8b composed of curves formed at one end portion thereof, second arresting portions 8c. 8c composed of curves formed at another end portion thereof, and third arresting portions 8d, 8d composed of recesses formed among the second arresting portions 8c, 8c. The arresting portions 8b, 8b, 8c and 8c are formed on both edge portions of the arresting plates 8, and both are bilaterally symmetrical having the same shapes. The first arresting portions 8b, 8b arrest the guide leg portion of the movable portion in one end position on the long guide groove. The second arresting portions 8c, 8c arrest the guide leg portion of the movable portion in another end position on the long guide groove. The third arresting portions 8d, 8d arrest the guide leg portion of the movable portion when the display unit section 2 rotates 90° to the keyboard unit section 1. Note that the total number of compression springs composing the elastic means 9 is 20, but there is no limit to this number. It is also acceptable to use an elastic means such as a plate spring, rubber, and the like.

Figure 11:
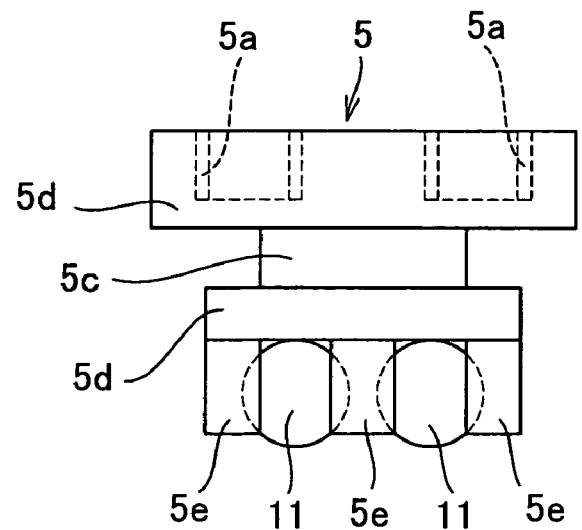
FIG. 11 is a side elevational view of the movable portion of the coupling device.
Figure 12:
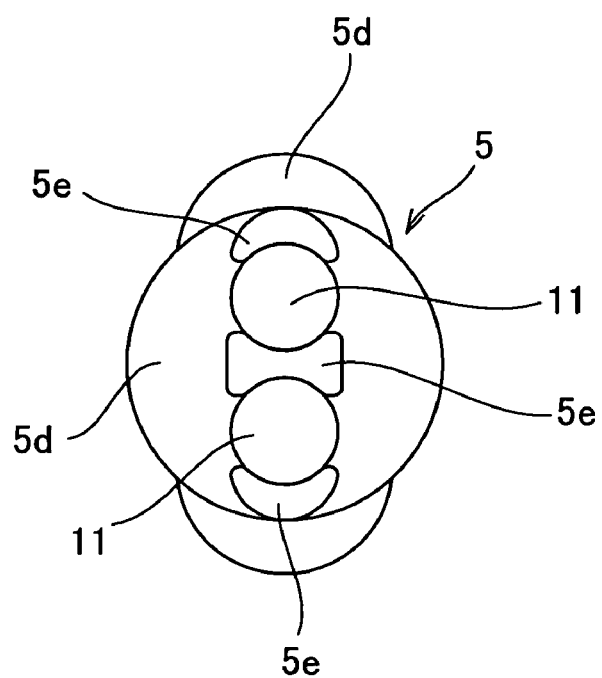
FIG. 12 is a bottom view of the movable portion of the coupling device.

The above-described moveable portion 5 is, as shown in FIG. 11 and FIG. 12 in particular, composed of a filling portion 5b having nearly an elliptical planar shape, and provided with female screws portion 5a and 5a; a guide axle portion 5c provided next to the fitting portion 5b, and engaging with the narrow-width portion 7c of the long guide hole 7a; a guide disc portion 5d engaging with the wide-width portion 7b of the long guide hole 7a provided next to the guide axle portion 5c; and three guide leg portions 5e projected on the bottom surface of the guide disc portions 5d, and engaging with the long guide grooves 6b of the case main body 6. A pair of ball bearings 11 and 11 are rotatably attached to the guide leg portion 5e. These ball bearings 11 are coated with lubricating oil, though not shown.

Figure 5:
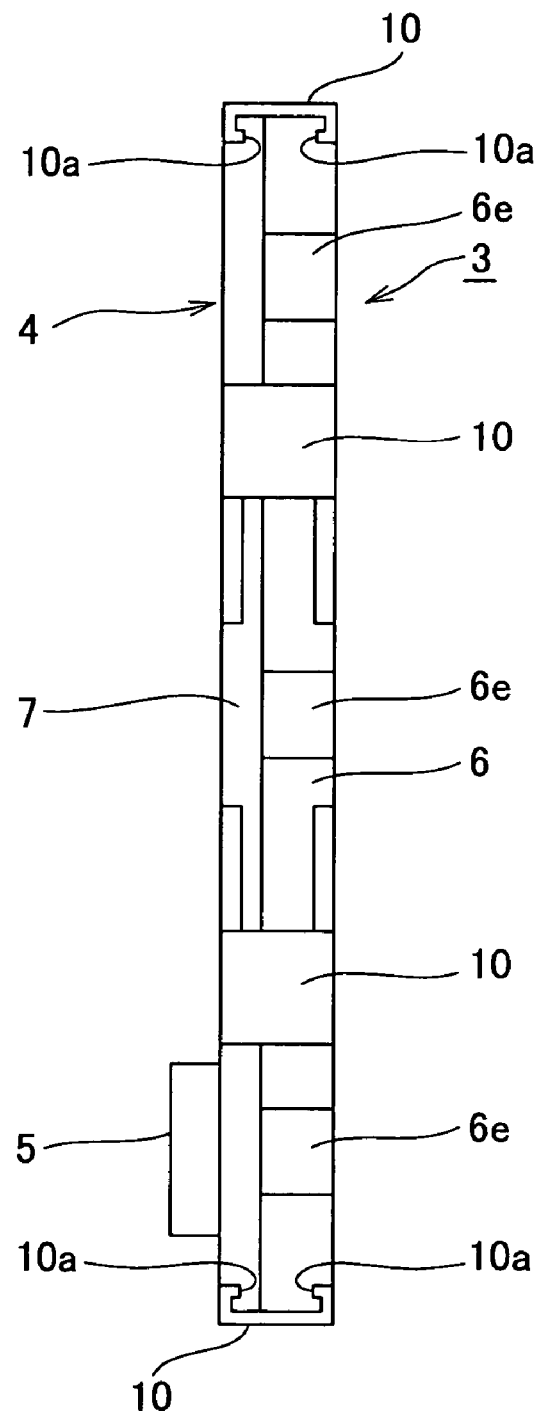
FIG. 5 is a right side elevational view of the coupling device according to the present invention.

In the portable telephone according to the embodiment shown in the drawings, the main body 4 of the coupling device 3 is fixed on the upper face side of the keyboard unit section 1 being the first member, and the movable portion 5 is fixed on the bottom face side of the display unit section 2 being the second member, as shown in FIG. 1 to FIG. 3. When the display unit section 2 is put on the upper face of the keyboard unit section 1, as shown in FIG. 1, the movable portion 5 is, as shown with the solid line in FIG. 4, at the lowest end of the long guide hole 7a provided on the lid body 7, and, as shown in FIG. 5, sandwiched by the arresting portions 8b and 8b of the arresting plates 8 and 8 in the arrest means 12. Thereby, the movable portion 5 is kept in an arrested state by being pushed by the elastic force of the elastic means 9. Accordingly, the keyboard unit section 1 being the first member and the display unit section 2 being the second member keep a stable halting state in lying on top of one another as shown in FIG. 1, and unless external force is applied, the overlapped position of both unit sections can not be shifted.

Figure 8:
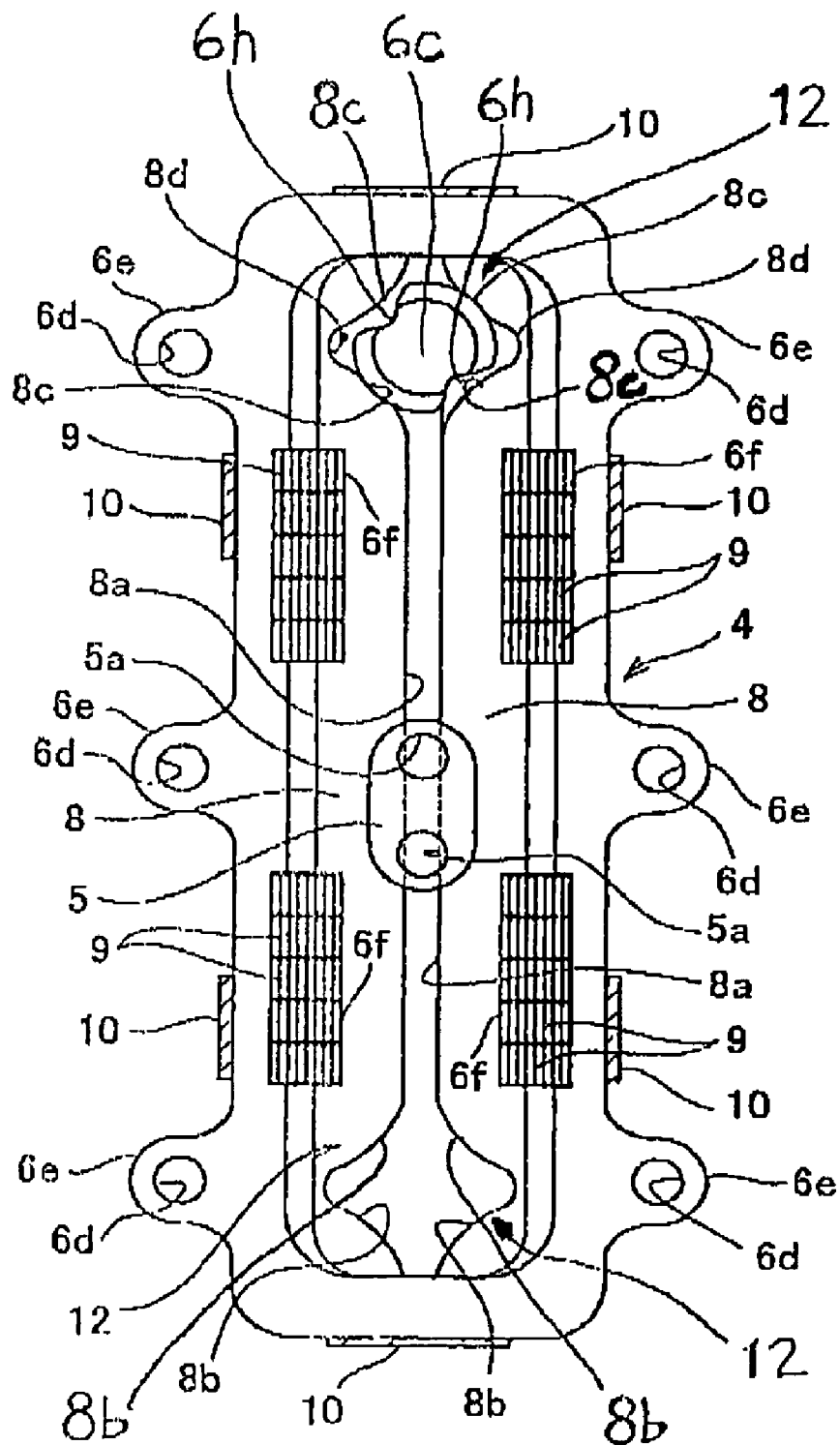
FIG. 8 is a plan view to explain the operation of the movable portion in a state shown in FIG. 6.

When the keyboard unit section 1 being the first member is held in one hand, and the display unit section 2 being the second member is pushed upward from the state shown in FIG. 1 with the other hand (accordingly, it is the same situation as when the display unit section 2 being the second member is held in one hand, and the keyboard unit section 1 being the first member is pushed downward with the other hand), the movable portion 5 is released from the arresting state by the arresting portions 8b and 8b of the arresting plates 8 and 8 in the arresting means 12 to guidedly slide along the inside between the long guide hole 7a of the lid body 7 and the long guide groove 6b of the case main body side. Accordingly, the arresting plates 8 and 8 are pushed open against an elastic force of the elastic means 9 as shown in FIG. 8, so that relative sliding of the keyboard unit section 1 being the first member and the display unit section 2 is made possible. At this time, the sliding is made in a free stop because the movable portion 5 is pushed from right and left by the arresting plates 8 and 8 of the arresting means 12.

Thus, when movable portion 5 reaches the upper end of the long guide hole 7a, it halts there, and arrested by the arresting portions 8c and 8c of the arresting plates 8 and 8 in the arrest means 12 to be halted steadily. FIG. 3 shows this state. Then, the keyboard 1a is exposed so that a user can operate the keyboard.

When a user wants to use the display unit section 2 laterally, the display unit section 2 is rotated rightward from the state shown in FIG. 3. Then, the display unit section 2 can rotate till the guide recess portion 6c abuts on the stopper walls 6h and 6h while the guide leg portions 5e of the movable portion 5 are guided by a guide recess portion 6c provided next to the long guide groove 6b, and at this abutted position, 90° rotation is realized. FIG. 3 shows the position of the display unit section 2 with respect to the keyboard unit section 1 in this state. The display unit section 2 is at a position to rotate 90° to the keyboard unit section 1. And at this position of rotation, the display unit section 2 is to keep a stably halting state with respect to the keyboard main body 1 by the leg portions of the movable portion 5 being arrested by the recess portions 8d and 8d of the arresting portions 8c and 8c in the arresting plates 8 and 8.

The rotation angle of the display unit section 2 is 90° in this embodiment, but it is not limited to this rotation angle. The rotation angle can be selected arbitrarily such as 45° or 150° by changing the positions of the stopper walls 6h and 6h.

When the rotated display unit section 2 is returned to the original position again, it can be returned to the original state by just rotating leftward. In order to return the display unit section 2 to a position where the display unit section 2 is overlaid on the upper side of the keyboard unit section 1, when the display unit section 2 is rotated, it is returned to the original position by rotating reversely, and by pushing the display unit section 2 downward with respect to the keyboard unit section 1, it returns to the original state that the display unit section 2 and the keyboard unit section 1 are laid on top of one another by the movable portions 5 being guided by the long guide groove 6b and the long guide hole 7a provided on the main body 4 side to pushedly open the arresting plates 8 and 8 against elastic force of the elastic means 9, so that it is to be arrested by the arresting portions 8b and 8b of the arresting plates 8 and 8 in the arresting means at this position. When the display unit section 2 is not rotated, it can be returned to the original position in the above-described way by just pushing downward.

Note that in the above embodiment, the main body 4 at the fixing position 3 is fixed on the side of the keyboard main body 1 being the first member, but it is already mentioned that the main body 4 is fixed on the side of the display unit section 2 being the second member side, and the movable portion 5 may be fixed on the side of the keyboard unit being the first member side.

Next, as for other embodiments, though in the above-described embodiment, it is shown that the movable portion 5 is structured to be rotatable to the main body 4, the rotation means can be provided on the fixing portion to fix the movable portion on the first member or the second member. For instance, a protrusion composing of a ball or a pin having elasticity is provided on the fixing portion of the movable portion, and a recess portion for receiving the protrusion is provided on any engaging portion of the first member 1 or the second member 2. When it is structured in this manner, the member fixed on the movable portion has a merit of being capable of rotating at any position of sliding.

Further, the arresting means for the movable portion is not required to be provided with the arresting plates 8 and 8 to which the elastic means 9 is applied, as in the case of the above-described embodiment, but a protrusion to which an elastic means is applied is provided on the movable portion side, and a recess portion for receiving the protrusion may be provided on the main body side.

Structured in this manner, it has a merit that the structure of an arresting means is simple.

What is claimed is:

1. A coupling device for a portable terminal to couple a first member and a second member to be relatively slidable and horizontally rotatable one of the members having a keyboard unit section and one of the members having a display unit section in respectively separate boxes thereof, said coupling device comprising:

a main body having a long guide groove extending in a longitudinal direction, the main body to be attached to the first member;

a movable portion at least partly in the long guide groove and movable in the longitudinal direction and rotatable at a selected end position of the long guide groove, the movable portion to be attached to the second member to make the second member rotatable horizontally at the selected end position;

an arresting means between said main body and said movable portion to stably halt the movable portion at a selected position;

wherein said arresting means is composed of a pair of arresting plates slidably biased in mutually opposite directions to sandwich a portion of said movable portion, and;

wherein the arresting means for halting said movable portion at the selected position comprises a protruding portion attached to said movable member in a slidably biased state in one direction and a recess portion provided on said main body to receive the protruding portion.

2. A coupling device for a portable terminal to couple a first member and a second member to be relatively slidable and horizontally rotatable, one of the members having a keyboard unit section and one of the members having a display unit section in respectively separate boxes thereof, said coupling device comprising:

a main body having a long guide groove extending in a longitudinal direction, the main body to be attached to the first member;

a movable portion at least partly in the long guide groove and movable in the longitudinal direction and rotatable at a selected end position of the long guide groove, the movable portion to be attached to the second member to make the second member rotatable horizontally at the selected end position;

wherein said main body is provided with a pair of rectangular arresting plates each structured with central flat press portions and arresting means formed on end portions for halting said movable portion at a selected position, and an elastic means for slidably biasing said arresting plates against each other;

wherein said movable portion having a guide leg portion engaged with said long guide groove;

wherein said long guide groove having a guide recess portion for allowing the guide leg portion to rotate horizontally;

wherein said main body is composed of a case main body provided with the long guide groove, and a lid portion provided with a long guided hole communicating with the long guide groove, and;

wherein said movable portion is composed of a head portion to be passed through said long guide hole and a guide leg portion to be fitted into said long guide groove, and a guide recess portion is provided next to said long guide groove for allowing the guide leg portion to rotate.

3. A coupling device for a portable terminal to couple a first member and a second member to be relatively slidable and horizontally rotatable, one of the members having a keyboard unit section and one of the members having a display unit section in respectively separate boxes thereof, said coupling device comprising:

a main body having a long guide groove extending in a longitudinal direction, the main body to be attached to the first member;

a movable portion having a guide leg portion engaged with said long guide groove and movable in the longitudinal direction and rotatable at a selected end position of the long guide groove, the movable portion attached to the second member to make the second member rotatable horizontally the selected end position;

wherein said main body is provided with a pair of rectangular arresting plates each structured with central flat press portions and arresting means formed on end portions for halting said movable portion at a selected position, and an elastic means for slidably biasing said arresting plates against each other;

wherein said long guide groove having a guide recess portion for allowing the guide leg portion to rotate horizontally;

wherein said main body is composed of a case main body provided with the long guide groove, and a lid portion provided with a long guided hole communicating with the long guide groove, and;

wherein said movable portion is composed of a head portion to be passed through said long guide hole; a guide leg portion to be fitted into said long guide groove, a guide recess portion is provided next to said long guide groove for allowing the guide leg portion to rotate, and bearings to be attached to said guide leg portion of said movable portion to allow a portion of the bearings to be movable along said long guide groove.

4. A coupling device for a portable terminal to couple a first member and a second member to be relatively slidable and horizontally rotatable, one of the members having a keyboard unit section and one of the members having a display unit section in respectively separate boxes thereof, said coupling device comprising:

a main body having a long guide groove extending in a longitudinal direction, the main body to be attached to the first member;

a movable portion at least partly in the long guide groove and movable in the longitudinal direction and rotatable at a selected end position of the long guide groove, the movable portion to be attached to the second member to make the second member rotatable horizontally at the selected end position;

wherein said main body is provided with a pair of rectangular arresting plates each structured with central flat press portions and arresting means formed on end portions for halting said movable portion at a selected position, and an elastic means for slidably biasing said arresting plates against each other;

wherein said long guide groove having a guide recess portion for allowing a guide leg portion of said movable portion to rotate horizontally;

wherein said main body is composed of a case main body provided with the long guide groove; and a lid portion provided with a long guided hole communicating with the long guide groove, and;

wherein said movable portion is composed of a head portion to be passed through said long guide hole, a guide leg portion to be fitted into said long guide groove, a guide recess portion is provided next to said long guide groove for allowing the guide leg portion to rotate, and a stopper protrusion provided in said guide recess portion to control rotation of said movable portion.

5. A coupling device for a portable terminal to couple a first member and a second member to be relatively slidable and horizontally rotatable, one of the members having a keyboard unit section and one of the members having a display unit section in respectively separate boxes thereof, said coupling device comprising:

a main body having a long guide groove extending in a longitudinal direction, the main body to be attached to the first member;

a movable portion at least partly in the long guide groove and movable in the longitudinal direction and rotatable at a selected end position of the long guide groove, the movable portion to be attached to the second member to make the second member rotatable horizontally at the selected end position;

wherein said main body is provided with a pair of rectangular arresting plates each structured with central flat press portions and arresting means formed on end portions for halting said movable portion at a selected position, and an elastic means for slidably biasing said arresting plates against each other;

wherein said long guide groove having a guide recess portion for allowing the guide leg portion to rotate horizontally;

wherein said main body is composed of a case main body provided with the long guide groove, and a lid portion provided with a long guided hole communicating with the long guide groove, and;

wherein said movable portion composed of a head portion to be passed through said long guide hole, a guide leg portion to be fitted into said long guide groove, and a guide recess portion is provided next to said long guide groove for allowing a guide leg portion of the movable portion to rotate, and;

wherein said case main body and said lid portion are engagedly fixed with an arresting member having a C-shaped channel.

6. A coupling device for a portable terminal to couple a first member and a second member to be relatively slidable and horizontally rotatable, one of the members having a keyboard unit section and one of the members having a display unit section in respectively separate boxes thereof, said coupling device comprising:

a main body having a long guide groove extending in a longitudinal direction, the main body to be attached to the first member;

a movable portion at least partly in the long guide groove and movable in the longitudinal direction and rotatable at a selected end position of the long guide groove, the movable portion to be attached to the second member to make the second member rotatable horizontally at the selected end position;

wherein said main body is provided with a pair of rectangular arresting plates each structured with central flat press portions and arresting means formed on end portions for halting said movable portion at a selected position, and an elastic means for slidably biasing said arresting plates against each other;

wherein said long guide groove having a guide recess portion for allowing a guide leg portion of the movable portion to rotate horizontally;

wherein said arresting means comprises first arresting portions composed of curves formed at one end portion thereof, second arresting portions composed of curves formed at another end portion thereof, and third arresting portions composed of recesses formed among the second arresting portions.

7. A coupling device for a portable terminal to couple a first member and a second member to be relatively slidable and horizontally rotatable, one of the members having a keyboard unit section and one of the members having a display unit section in respectively separate boxes thereof, said coupling device comprising:

a main body having a long guide groove extending in a longitudinal direction, the main body to be attached to the first member;

a movable portion at least partly in the long guide groove and movable in the longitudinal direction and rotatable at a selected end position of the long guide groove, the movable portion to be attached to the second member to make the second member rotatable horizontally at the selected end position;

wherein said main body is provided with a pair of rectangular arresting plates each structured to have central flat press portions and arresting means formed on end portions for halting said movable portion at a selected position in the longitudinal direction, and an elastic means for slidably biasing said arresting plates against each other;

wherein said movable portion having a guide leg portion engaged with said long guide groove;

wherein said long guide groove having a guide recess portion for allowing the guide leg portion to rotate horizontally;

wherein said means for halting said movable portion at a selected position comprises a protruding portion attached to said movable portion in a slidable biased state in one direction, and a recess portion provided on said main body to receive the protruding portion.

* * * * *